(12) United States Patent
Kwon et al.

(10) Patent No.: US 8,681,697 B2
(45) Date of Patent: Mar. 25, 2014

(54) METHOD FOR UPLINK TRANSMITTING CONTROL INFORMATION

(75) Inventors: Yeong Hyeon Kwon, Daejeon-si (KR);
Min Seok Noh, Seoul (KR); Jin Sam Kwak, Gunpo-si (KR); Dong Cheol Kim, Suwon-si (KR); Jae Hoon Chung, Yongin-si (KR); Sung Ho Moon, Anyang-si (KR); Seung Hee Han, Anyang-si (KR); Hyun Woo Lee, Anyang-si (KR); Moon Il Lee, Yongin-si (KR)

(73) Assignee: LG Electronics Inc., Seoul (KR)

(*) Notice: Subject to any disclaimer, the term of this patent is extended or adjusted under 35 U.S.C. 154(b) by 41 days.

(21) Appl. No.: 13/057,427

(22) PCT Filed: Aug. 11, 2009

(86) PCT No.: PCT/KR2009/004469
§ 371 (c)(1),
(2), (4) Date: Feb. 3, 2011

(87) PCT Pub. No.: WO2010/018970
PCT Pub. Date: Feb. 18, 2010

(65) Prior Publication Data
US 2011/0134747 A1    Jun. 9, 2011

Related U.S. Application Data

(60) Provisional application No. 61/087,737, filed on Aug. 11, 2008, provisional application No. 61/108,870, filed on Oct. 28, 2008.

(30) Foreign Application Priority Data

Jan. 15, 2009  (KR) .................... 10-2009-0003311

(51) Int. Cl.
*H04W 4/00* (2009.01)

(52) U.S. Cl.
USPC ........... 370/328; 370/436; 370/442; 370/474; 375/132

(58) Field of Classification Search
None
See application file for complete search history.

(56) References Cited

U.S. PATENT DOCUMENTS 6,141,393 A    10/2000  Thomas et al.
7,620,096 B2   11/2009  Bar-Ness et al.
(Continued)

FOREIGN PATENT DOCUMENTS

CN    1006659 A    5/1987
CN    1770658      5/2006
(Continued)

OTHER PUBLICATIONS

Papasakellarious et al. "Sequence Hopping in SC-FDMA Communication Systems" Aug. 30, 2007.*
(Continued)

*Primary Examiner* — Bob Phunkulh
(74) *Attorney, Agent, or Firm* — McKenna Long & Aldridge LLP

(57) ABSTRACT

A method for uplink transmitting control information from a user equipment in a wireless communication system comprises selecting a specific point among a plurality of points distributed into a symbol space, corresponding to control information, the symbol space including a modulation dimension and a sequence dimension; mapping a signal corresponding to the specific point with a control channel including single carrier-frequency division multiple access (SC-FDMA) symbols; and transmitting the control channel. Preferably, the specific point belongs to the sequence dimension.

14 Claims, 11 Drawing Sheets

(56) References Cited

U.S. PATENT DOCUMENTS

| | | | |
|---|---|---|---|
| 7,724,836 B2 | 5/2010 | Hartmann et al. | |
| 7,995,615 B2 | 8/2011 | Yang et al. | |
| 8,116,277 B2 | 2/2012 | Lee et al. | |
| 8,238,320 B2 * | 8/2012 | Kim et al. | 370/344 |
| 8,249,608 B2 | 8/2012 | Heo et al. | |
| 8,331,305 B2 | 12/2012 | Wennstrom et al. | |
| 8,385,467 B2 | 2/2013 | Han et al. | |
| 2003/0235147 A1 | 12/2003 | Walton | |
| 2005/0047387 A1 * | 3/2005 | Frederiksen et al. | 370/349 |
| 2005/0190728 A1 | 9/2005 | Han et al. | |
| 2006/0039496 A1 | 2/2006 | Chae et al. | |
| 2006/0093066 A1 | 5/2006 | Jeong et al. | |
| 2006/0133530 A1 | 6/2006 | Kwak et al. | |
| 2006/0209754 A1 * | 9/2006 | Ji et al. | 370/329 |
| 2007/0014272 A1 * | 1/2007 | Palanki et al. | 370/344 |
| 2007/0036179 A1 | 2/2007 | Palanki et al. | |
| 2007/0171849 A1 | 7/2007 | Zhang et al. | |
| 2007/0183386 A1 | 8/2007 | Muharemovic et al. | |
| 2007/0189404 A1 | 8/2007 | Baum et al. | |
| 2008/0095252 A1 | 4/2008 | Kim et al. | |
| 2008/0117833 A1 | 5/2008 | Borran et al. | |
| 2008/0153425 A1 | 6/2008 | Heo et al. | |
| 2008/0165893 A1 | 7/2008 | Malladi et al. | |
| 2008/0186916 A1 | 8/2008 | Oshiba et al. | |
| 2008/0186918 A1 * | 8/2008 | Tinnakornsrisuphap et al. | 370/331 |
| 2008/0198902 A1 * | 8/2008 | Malladi | 375/134 |
| 2008/0205348 A1 | 8/2008 | Malladi | |
| 2008/0212506 A1 | 9/2008 | Lee et al. | |
| 2008/0212514 A1 | 9/2008 | Chen | |
| 2008/0212555 A1 * | 9/2008 | Kim et al. | 370/344 |
| 2008/0227481 A1 * | 9/2008 | Naguib et al. | 455/550.1 |
| 2008/0232240 A1 | 9/2008 | Baum et al. | |
| 2008/0232449 A1 * | 9/2008 | Khan et al. | 375/220 |
| 2008/0233966 A1 | 9/2008 | Scheim et al. | |
| 2008/0253484 A1 | 10/2008 | Kakura et al. | |
| 2008/0273513 A1 | 11/2008 | Montojo et al. | |
| 2008/0273516 A1 * | 11/2008 | Kim et al. | 370/344 |
| 2008/0318608 A1 | 12/2008 | Inoue et al. | |
| 2009/0010240 A1 | 1/2009 | Papasakellariou et al. | |
| 2009/0028261 A1 | 1/2009 | Zhang et al. | |
| 2009/0034468 A1 | 2/2009 | Muharemovic et al. | |
| 2009/0046645 A1 | 2/2009 | Bertrand et al. | |
| 2009/0046694 A1 * | 2/2009 | Matsumoto et al. | 370/343 |
| 2009/0060004 A1 * | 3/2009 | Papasakellariou et al. | 375/140 |
| 2009/0073955 A1 * | 3/2009 | Malladi | 370/349 |
| 2009/0092073 A1 | 4/2009 | Doppler et al. | |
| 2009/0092148 A1 | 4/2009 | Zhang et al. | |
| 2009/0186613 A1 | 7/2009 | Ahn et al. | |
| 2009/0196240 A1 | 8/2009 | Frederiksen et al. | |
| 2009/0196249 A1 * | 8/2009 | Kawamura et al. | 370/330 |
| 2009/0239476 A1 * | 9/2009 | Womack et al. | 455/68 |
| 2009/0245194 A1 | 10/2009 | Damnjanovic et al. | |
| 2009/0245212 A1 | 10/2009 | Sambhwani et al. | |
| 2009/0245284 A1 | 10/2009 | Xu et al. | |
| 2009/0268833 A1 | 10/2009 | Ariyavisitakul et al. | |
| 2009/0276507 A1 | 11/2009 | Ahn et al. | |
| 2009/0276675 A1 | 11/2009 | Ojala et al. | |
| 2009/0280819 A1 * | 11/2009 | Brisebois et al. | 455/446 |
| 2009/0285160 A1 | 11/2009 | Cheng et al. | |
| 2009/0323617 A1 | 12/2009 | Che et al. | |
| 2009/0323625 A1 | 12/2009 | Lee et al. | |
| 2010/0046584 A1 * | 2/2010 | Palanki et al. | 375/134 |
| 2010/0061361 A1 | 3/2010 | Wu | |
| 2010/0091672 A1 | 4/2010 | Ishii | |
| 2010/0098012 A1 | 4/2010 | Bala et al. | |
| 2010/0135360 A1 * | 6/2010 | Kwak et al. | 375/135 |
| 2010/0150081 A1 | 6/2010 | Gao et al. | |
| 2010/0150114 A1 | 6/2010 | Che | |
| 2010/0177741 A1 * | 7/2010 | Zhang et al. | 370/335 |
| 2010/0177804 A1 * | 7/2010 | Kwak et al. | 375/141 |
| 2010/0179862 A1 | 7/2010 | Chassin et al. | |
| 2010/0183104 A1 | 7/2010 | Alexander et al. | |
| 2010/0195594 A1 | 8/2010 | Seo et al. | |
| 2010/0227569 A1 | 9/2010 | Bala et al. | |
| 2010/0329200 A1 | 12/2010 | Chen et al. | |
| 2010/0329220 A1 | 12/2010 | Kim et al. | |
| 2011/0009137 A1 | 1/2011 | Chung et al. | |
| 2011/0064164 A1 | 3/2011 | Seo et al. | |
| 2011/0103367 A1 * | 5/2011 | Ishii | 370/350 |
| 2011/0134861 A1 | 6/2011 | Seo et al. | |
| 2011/0158200 A1 | 6/2011 | Bachu et al. | |
| 2011/0194524 A1 | 8/2011 | Hedlund et al. | |
| 2011/0199997 A1 | 8/2011 | Wennstrom et al. | |
| 2011/0205928 A1 | 8/2011 | Pelletier et al. | |
| 2011/0205996 A1 | 8/2011 | Kim et al. | |
| 2011/0211522 A1 | 9/2011 | Chung et al. | |
| 2011/0261729 A1 | 10/2011 | Ahn et al. | |
| 2011/0261895 A1 | 10/2011 | Zhang et al. | |
| 2011/0268053 A1 | 11/2011 | Che et al. | |
| 2011/0274079 A1 | 11/2011 | Lee et al. | |
| 2011/0280203 A1 | 11/2011 | Han et al. | |
| 2011/0292900 A1 | 12/2011 | Ahn et al. | |
| 2012/0026966 A1 | 2/2012 | Wennstrom et al. | |
| 2012/0082113 A1 | 4/2012 | Lee et al. | |
| 2012/0083302 A1 | 4/2012 | Borran et al. | |
| 2012/0099546 A1 | 4/2012 | Cho et al. | |
| 2012/0177012 A1 | 7/2012 | Buckley et al. | |
| 2012/0236773 A1 | 9/2012 | Shen et al. | |
| 2012/0263250 A1 | 10/2012 | Yap et al. | |
| 2013/0016701 A1 | 1/2013 | Malladi et al. | |
| 2013/0129013 A1 | 5/2013 | Han et al. | |
| 2013/0178221 A1 | 7/2013 | Jung et al. | |

FOREIGN PATENT DOCUMENTS

| | | |
|---|---|---|
| CN | 101006658 | 7/2007 |
| CN | 101027867 | 8/2007 |
| JP | 2004-524727 A | 8/2004 |
| JP | 2007-536830 A | 12/2007 |
| JP | 2009-290615 A | 12/2009 |
| JP | 2011-530941 A | 12/2011 |
| KR | 10-2005-0081552 A | 8/2005 |
| KR | 10-0800795 | 12/2005 |
| KR | 10-2006-0032765 A | 4/2006 |
| KR | 10-2007-0074431 A | 7/2007 |
| KR | 10-2007-0091889 | 9/2007 |
| KR | 10-2007-0119958 A | 12/2007 |
| KR | 10-2008-0056621 A | 6/2008 |
| KR | 10-2008-0065562 A | 7/2008 |
| KR | 1020080064756 A | 7/2008 |
| KR | 10-2008-0073616 A | 8/2008 |
| KR | 10-2008-0096088 A | 10/2008 |
| KR | 10-2008-0097360 A | 11/2008 |
| WO | WO 03/021795 A2 | 3/2003 |
| WO | WO 2006-019253 A1 | 2/2006 |
| WO | WO 2007/084988 A2 | 7/2007 |
| WO | WO 2007/119415 A1 | 10/2007 |
| WO | WO 2008/044830 A1 | 4/2008 |
| WO | WO 2008/137864 A2 | 11/2008 |

OTHER PUBLICATIONS

Nokia Siemens Networks et al., ACK/NACK Bundling Details for LTE TDD, 3GPP R1-081858, May 9, 2008.
Qualcomm Europe, II ACK/NACK assignment procedure, 3GPP R1-083176, Aug. 22, 2008.
InterDigital Communications et al., ACK/NACK Index Mapping for Uplink Transmission for E-UTRA, 3GPP R1-074701, Nov. 9, 2007.
Huawei, Physical layer technologies for LTE-Advanced, 3GPP R1-081838, May 9, 2008.
Motorola, Uplink ACK/NACK for TDD, 3GPP R1-081292, Apr. 4, 2008.
Nokia Siemens Networks et al., Implicit Mapping of ACKNACK Resources, 3GPP R1-080939, Feb. 15, 2008.
LG Electronics Inc., Efficient Utilization of Unused PUCCH RB, 3GPP R1-081258, Apr. 4, 2008.
Nokia Siemens Networks et al., PUCCH Resource Allocation for Repeated ACK/NACK, 3GPP R1-083722, Oct. 3, 2008.
Ericsson, Carrier aggregation in LTE-Advanced, 3GPP TSG-RAN WG1 #53bis, R1-082468, Jul. 2008.
NEC Group, PUCCH allocation for ACK/NACK transmission, 3GPP TSG RAN WG1 Meeting #50, R1-073462, Aug. 2007.

(56) References Cited

OTHER PUBLICATIONS

Motorola, UL ACK/NACK for TDD, 3GPP TSG RAN1 #52, R1-080738, Feb. 2008.
Nortel, UL MIMO Enhancement for LTE-A, 3GPP R1-082516, Jul. 5, 2008.
Mitsubishi Electric, Uplink transmit diversity schemes for LTE Advanced, 3GPP R1-082522, Jul. 4, 2008.
Alcatel, ST/SF Coding and Mapping Schemes of the SC-FDMA in E-UTRA Uplink, 3GPP R1-063178, Nov. 10, 2006.
Qualcomm Europe, Further details on UL ACK/NACK resource allocation, 3GPP R1-081966, May 9, 2008.
Texas Instruments et al., On Remaining Issues of PUCCH Slot Based CS/OC Remapping, 3GPP R1-082660, Jul. 4, 2008.
Panasonic et al., Joint Way forward on the ACK/NACK scrambling for PUCCH, 3GPP R1-082731, Jul. 4, 2008.
T.G. Noh et al.: "Standardization of 3GPP LTE and LTE-Advanced", Electronics and Communication Trend Analysis, vol. 23, No. 3, Jun. 2008. See chapter II-2.
LG Electronics, "Uplink MIMO Transmission for LTE-Advanced", 3GPP TSG RAN WG1 Meeting #55, Prague, Czech Republic, Nov. 10-14, 2008, R1-084199.
Nortel, "Performance Evaluation of Multi-Antenna SC-FDMA in LTE-A", 3GPP TSG-RAN WG1 #55, Prague, Czech Republic, Nov. 10-14, 2008, R1-084471.
Nokia Siemens Networks et al., PUCCH Resource Allocation for Repeated ACK/NACK, 3GPP R1-083094, Aug. 22, 2008.

* cited by examiner

METHOD FOR UPLINK TRANSMITTING CONTROL INFORMATION

This application is a National Stage Entry of International Application No. PCT/KR2009/004469, filed Aug. 11, 2009, and claims the benefit of U.S. Provisional Application Ser. No. 61/087,737, filed Aug. 11, 2008, U.S. Provisional Application Ser. No. 61/108,870, filed Oct. 28, 2008, and Korean Application No. 10-2009-0003311, filed Jan. 15, 2009, all of which are hereby incorporated by reference in their entirety herein.

DETAILED DESCRIPTION OF THE INVENTION

1. Technical Field

The present invention relates to a wireless communication system, and more particularly to, a method for uplink transmitting control information in a wireless communication system.

2. Background Art

A wireless communication system for next generation should transmit multimedia data of high quality at high speed using limited radio resources. To transmit such multimedia data at high speed in a radio channel having a limited bandwidth, the system should overcome frequency selective fading and inter-symbol interference occurring during high-speed transmission while maximizing spectral efficiency.

To improve throughput of the wireless communication system, a closed-loop transmission scheme that uses a channel condition between a base station and a user equipment has been developed. An adaptive modulation and coding (AMC) scheme is to increase link performance by controlling a modulation and coding scheme (MCS) using channel status information which is fed back.

Accordingly, the base station can perform frequency selective scheduling by receiving a downlink channel status from each user equipment. Various kinds of uplink control information are transmitted through an uplink control channel. Examples of an uplink control signal include acknowledgement/non-acknowledgement (ACK/NACK) signals for performing hybrid automatic repeat request (HARQ), a channel quality indicator (CQI) indicating downlink channel quality, a precoding matrix index (PMI), and a rank indicator (RI).

Since uplink transmission is performed by the user equipment, it is important that the user equipment has a low peak-to-average power ratio (PAPR) to lower battery consumption. To this end, $3^{rd}$ generation partnership project (3GPP) long-term evolution (LTE) performs uplink transmission using a modulation scheme having a single carrier feature.

DESCRIPTION OF THE INVENTION

Technical Problems

For system operation in IMT-Advanced, a multiple carrier based transmission scheme can be used to enable broadband communication in addition to a conventional single carrier based OFDM transmission scheme. Also, a transmission and reception scheme based on combination of a single carrier based transmission scheme and a multiple carrier based transmission scheme may be considered. A user equipment may be operated selectively in respective carriers, or may transmit and receive data using various carriers simultaneously. Under the circumstances, an uplink control channel should transmit channel information of multiple bands. This could lead to load of a symbol space of the uplink control channel. Also, IMT-Advanced uses multiple-input multiple-output (MIMO) antennas even in an uplink to increase throughput. In this case, as the number of such transmitting antennas increases, the amount of information increases correspondingly. This could lead to load of the symbol space of the uplink control channel.

Furthermore, to fulfill quality of service (QoS) desired by users and resolve coverage hole, an arbitrary node that can be optionally turned on/off has been discussed. The arbitrary node is designed based on throughput not capacity, and includes a femto cell and a pico cell. The femto cell may have a service radius of 30 m or less and its service can be provided for homes and offices. The pico cell has a service radius of 100 m or less and its service can be provided within buildings. The arbitrary node downwardly transmits a signal using the power of 0.1 watt or less. In such an arbitrary node, a channel between a user equipment and a base station is close to flat fading due to small coverage of the arbitrary node. Also, it is almost impossible to operate the user equipment at high speed within the arbitrary node. Particularly, since coverage of the user equipment may be longer than that of the arbitrary node, it may be considered to use the uplink control channel more efficiently.

Accordingly, the present invention is directed to a method for uplink transmitting control information in a wireless communication system, which substantially obviates one or more problems due to limitations and disadvantages of the related art.

An object of the present invention is to provide various methods for increasing the amount of information that can be transmitted through an uplink control channel in a wireless communication system.

Another object of the present invention is to provide various methods for increasing the amount of information that can be transmitted through an uplink control channel when single carrier based uplink transmission is extended to multiple carrier based uplink transmission.

Still another object of the present invention is to provide various methods for increasing the amount of information that can be transmitted through an uplink control channel when single antenna based uplink transmission is extended to multiple antenna based uplink transmission.

Further still another object of the present invention is to provide various methods for increasing the amount of information that can be transmitted through an uplink control channel in an arbitrary node such as a femto cell.

It is to be understood that technical problems to be solved by the present invention are not limited to the aforementioned technical problems and other technical problems which are not mentioned will be apparent from the following description to the person with an ordinary skill in the art to which the present invention pertains.

Technical Solutions

In one aspect of the present invention, a method for uplink transmitting control information from a user equipment in a wireless communication system comprises selecting a specific point among a plurality of points distributed into a symbol space, each point corresponding to control information, the symbol space including a modulation dimension and a sequence dimension; mapping a signal corresponding to the specific point with a control channel included in a subframe, the subframe including a plurality of single carrier-frequency division multiple access (SC-FDMA) symbols; and transmitting the control channel. Preferably, the specific point belongs to the sequence dimension.

The sequence dimension includes orthogonal sequence, quasi-orthogonal sequence, or pseudo noise (PN) sequence. Specifically, the sequence dimension includes Zadoff-Chu (ZC) sequence, constant amplitude zero autocorrelation waveform (CAZAC) sequence, walsh sequence, and discrete fourier transform (DFT) sequence.

The symbol region further includes a frequency dimension. Specifically, the frequency dimension includes a subcarrier group, a channel, a subband, or a hopping pattern.

Advantageous Effects

According to the embodiments of the present invention, the following advantages can be obtained.

First of all, it is possible to increase the amount of information that can be transmitted through an uplink control channel in a wireless communication system.

Second, it is possible to increase the amount of information that can be transmitted through an uplink control channel when single carrier based uplink transmission is extended to multiple carrier based uplink transmission.

Third, it is possible to increase the amount of information that can be transmitted through an uplink control channel when single antenna based uplink transmission is extended to multiple antenna based uplink transmission.

Finally, it is possible to increase the amount of information that can be transmitted through an uplink control channel in an arbitrary node such as a femto cell.

It is to be understood that the advantages that can be obtained by the present invention are not limited to the aforementioned advantages and other advantages which are not mentioned will be apparent from the following description to the person with an ordinary skill in the art to which the present invention pertains.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Hereinafter, structures, operations, and other features of the present invention will be understood readily by the preferred embodiments of the present invention, examples of which are illustrated in the accompanying drawings. Embodiments described later are examples in which technical features of the present invention are applied to 3GPP system.

Figure 1:
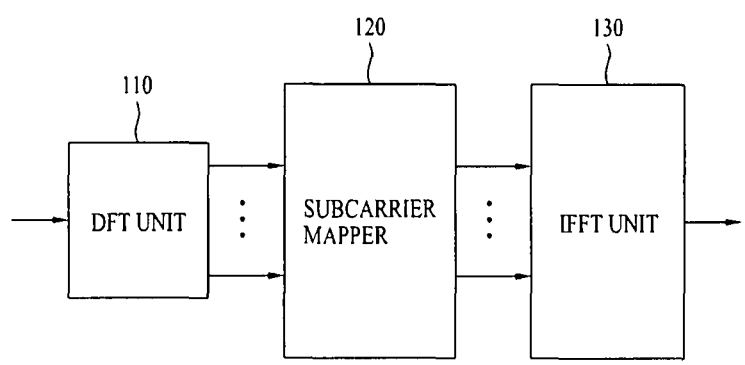
FIG. 1 is a block diagram illustrating a transmitter according to SC-FDMA scheme.

FIG. 1 is a block diagram illustrating a transmitter according to a single carrier-frequency division multiple access (SC-FDMA) scheme. SC-FDMA scheme is also referred to DFT-s-OFDMA (Discrete Fourier Transform-Spread-OFDMA) scheme.

Referring to FIG. 1, the SC-FDMA transmitter includes a discrete fourier transform (DFT) unit 110 performing DFT, a subcarrier mapper 120, and an inverse fast fourier transform (IFFT) unit 130 performing IFFT.

The DFT unit 110 outputs frequency region symbols by performing DFT for input data of a time region. The subcarrier mapper 120 maps the frequency region symbols with each subcarrier. The IFFT unit 130 outputs time region signals by performing IFFT for the frequency region symbols.

Figure 2:
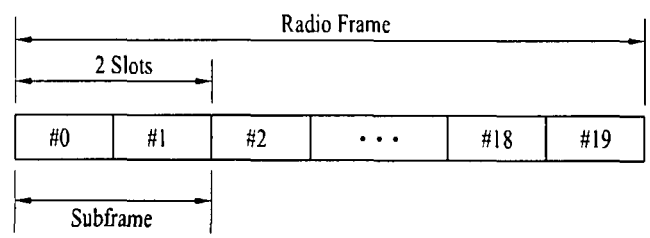
FIG. 2 is a diagram illustrating a structure of a radio frame.

FIG. 2 is a diagram illustrating a structure of a radio frame that can be applied to the embodiment of the present invention.

Referring to FIG. 2, the radio frame includes ten subframes, each of which includes two slots. The time required to transmit subframes will be referred to as a transmission time interval (TTI). For example, each subframe has a length of 1 ms, and one slot has a length of 0.5 ms. The slot includes a plurality of OFDM or SC-FDMA symbols in a time region, and includes a plurality of resource blocks in a frequency region. The aforementioned structure of the radio frame is only exemplary, and various modifications can be made in the number of subframes included in the radio frame or the number of slots included in the subframe, or the number of OFDM or SC-FDMA symbols included in the slot.

Figure 3:
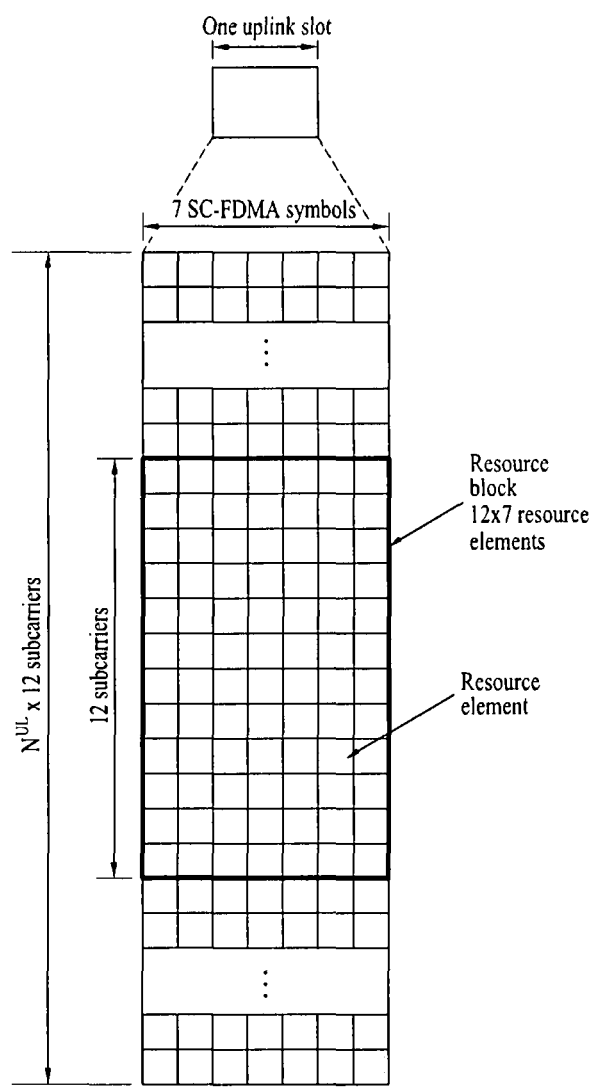
FIG. 3 is a diagram illustrating a resource grid of an uplink slot.

FIG. 3 is a diagram illustrating a resource grid of an uplink slot.

Referring to FIG. 3, the uplink slot includes a plurality of SC-FDMA symbols in a time region, and includes a plurality of resource blocks in a frequency region. In FIG. 3, the uplink slot includes, but not limited to, seven SC-FDMA symbols, and the resource block, but not limited to, includes twelve subcarriers. For example, the number of SC-FDMA symbols included in the uplink slot can be varied depending on a length of cyclic prefix (CP), or transmitting entity such as LTE-A entities (LTE-A UEs, LTE-A relays, etc). Each element on the resource grid will be referred to as a resource element. One resource element includes 12×7 resource elements. The number $N^{UL}$ of resource blocks included in the uplink slot is subjected to an uplink transmission bandwidth established in a cell.

Figure 4:
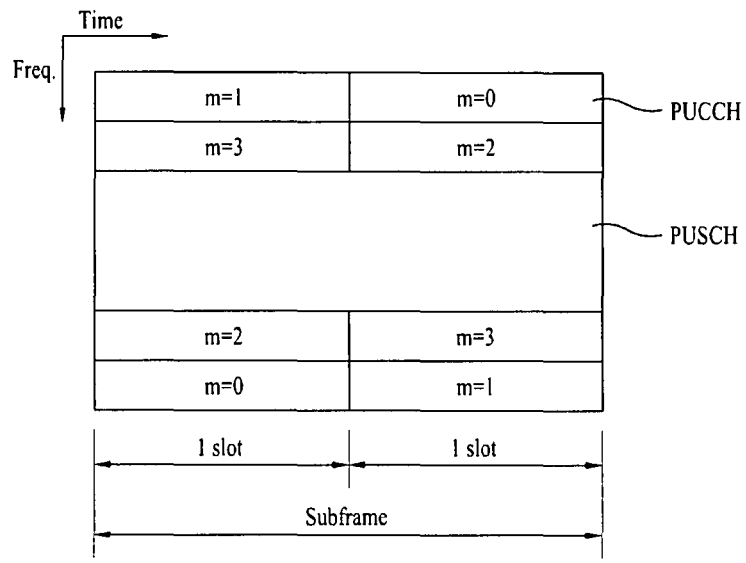
FIG. 4 is a diagram illustrating a structure of an uplink subframe.

FIG. 4 is a diagram illustrating a structure of an uplink subframe.

Referring to FIG. 4, the uplink subframe can be divided into a region to which a physical uplink control channel (PUCCH) carrying uplink control information is allocated, and a region to which a physical uplink shared channel (PUSCH) carrying user data. A center part of the subframe is allocated to the PUSCH, and both parts of the data region are allocated to the PUCCH in the frequency region. The user equipment does not transmit the PUCCH and the PUSCH simultaneously. However, in case of LTE-A or later specification, the simultaneous transmission of PUCCH and PUSCH is plausible.

Examples of uplink control information transmitted on the PUCCH include acknowledgement/non-acknowledgement (ACK/NACK) signals used to perform hybrid automatic repeat request (HARQ), a channel quality indicator (CQI) indicating a downlink channel status, and a scheduling request signal for requesting uplink radio resources.

The PUCCH for one user equipment uses one resource block that occupies different frequencies in each of two slots of the subframe. The two slots use different resource blocks (or subcarriers) within the subframe. Namely, frequency hopping is performed for two resource blocks allocated to the PUCCH, in a slot boundary. In FIG. 4, four PUCCHs for four user equipments, i.e., PUCCH of m=0, PUCCH of m=1, PUCCH of m=2, and PUCCH of m=3 are exemplarily allocated to the subframe.

The PUCCH can support multiple formats. Namely, uplink control information having different bits per subframe depending on a modulation scheme can be transmitted. For example, in case of binary phase shift keying (BPSK), uplink control information of 1 bit can be transmitted to the PUCCH. In case of quadrature phase shift keying (QPSK), uplink control information of 2 bits can be transmitted to the PUCCH.

Figure 5:
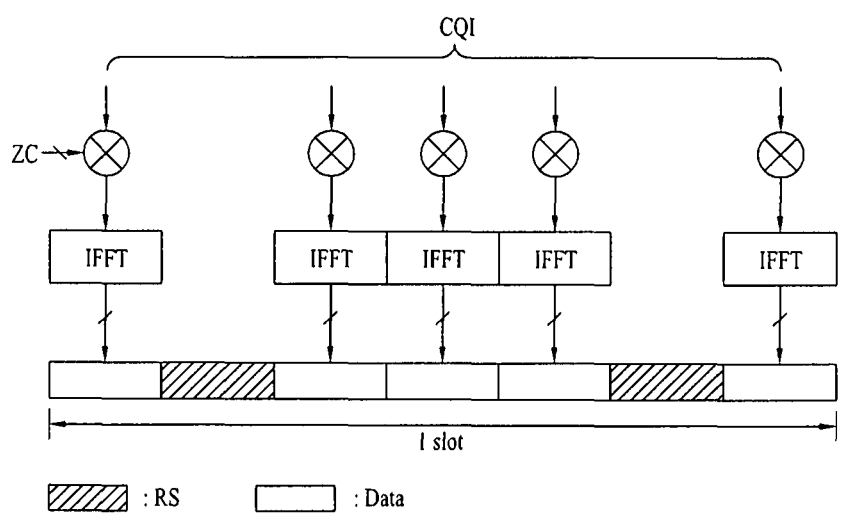
FIG. 5 is a diagram illustrating a structure of a CQI channel as an uplink control channel on a subframe.

FIG. 5 is a diagram illustrating a structure of a CQI channel as an uplink control channel on a subframe.

Referring to FIG. 5, in case of normal CP, a pilot (RS) is carried in two SC-FDMA symbols spaced apart from each other at an interval of three of seven SC-FDMA symbols included in one slot, and CQI is carried in the other five SC-FDMA symbols. Two pilots are used within one slot to support a user equipment of high speed. In case of extended CP, one slot includes six SC-FDMA symbols where one SC-FDMA symbol is allocated for pilot. Therefore the number of modulated symbols carrying CQI in one TTI is the same as ten both in normal CP case and extended CP case. Also, each user equipment is identified using orthogonal sequence (for example, cyclic shift version of one root sequence). CQI information symbols are modulated and then transmitted through all SC-FDMA symbols, each of which includes one sequence. Namely, the user equipment transmits CQI which has been modulated with each sequence.

The number of symbols that can be transmitted at one TTI is 10, and modulation of CQI is defined by up to QPSK. If QPSK mapping is used for SC-FDMA symbols, CQI value of 2 bits can be carried in the symbols. Accordingly, CQI value of 10 bits can be carried in one slot. As a result, CQI value of maximum 20 bits can be carried in one subframe.

A frequency region spreading sequence is used to spread CQI in the frequency region. The mandatory modulation sequence is a set of computer-generated sequences. However, ZC sequence can be used as the frequency region spreading sequence. Also, another sequence having excellent correlation characteristic can be used as the frequency region spreading sequence. Particularly, ZC sequence having different cyclic shift values can be used to identify each control channel.

ZC sequence c(k) having a length of N can be generated as follows.

$$c(k) = \begin{cases} e^{-j\frac{\pi M k(k+1)}{N}} & \text{for odd } N \\ e^{-j\frac{\pi M k^2}{N}} & \text{for even } N \end{cases} \quad \text{[Equation 1]}$$

In this case, k is in the range of $0 \leq k \leq N-1$, and M is a root index and is a natural number less than N, which is relatively prime to N. If N is defined, the number of root indexes means then number of available root ZC sequences.

ZC sequence c(k) has three features as follows.

$$|c(k; N, M)| = 1 \quad \text{for all } k, N, M \quad \text{[Equation 2]}$$

$$R_{M;N}(d) = \begin{cases} 1, & \text{for } d = 0 \\ 0, & \text{for } d \neq 0 \end{cases} \quad \text{[Equation 3]}$$

$$R_{M_1, M_2; N}(d) = p \quad \text{for all } M_1, M_2 \quad \text{[Equation 4]}$$

In Equation 2, ZC sequence always has a size of 1. In Equation 3, autocorrelation of ZC sequence is expressed by a Dirac-delta function, wherein the autocorrelation is based on circular correlation. Equation 4 means that cross correlation is always a constant.

Different kinds of two control signals can be multiplexed in the uplink control channel. For example, CQI and ACK/NACK can be multiplexed in the uplink control channel. Note that CQI in this invention means any measurement report on the downlink or uplink channel for the decision of transmission mode or handover between cells. It includes SNR, SINR, pilot power, synchronizing signal strength, received signal strength, interference or interference+noise, channel state information (CSI) RS measurement, transmission rank information, modulation and coding scheme (MCS), CoMP set indication, carrier selection information among multiple possible carriers in case of carrier aggregated environment, and so on.

EMBODIMENT

Method for Increasing Transmission Amount of Uplink Control Channel

Hereinafter, based on CQI channel structure designed from a single carrier based OFDM system or its evolved system, additional considerations occurring when a transmission system is extended to a multi-carrier or multi-antenna or extension/modification scheme will be described. Particularly, under a condition showing additive white Gaussian noise (AWGN) channel characteristic, such as femto cell, a method of transmitting an uplink control channel does not need to be the same as that in a macro cell. In this respect, a method of extending a symbol space to increase information amount in an uplink control channel and a method of modifying a structure for transmitting multiplexed information will be described.

In more detail, in the present invention, a CQI channel of 3GPP LTE is used as an example of an uplink control channel.

It is to be understood that the CQI channel is used to assist understanding of the present invention and the scope of the present invention is not limited up to the CQI channel. Accordingly, the following description can be applied even in case that a CQI channel structure is varied. Also, the following description can be applied to a control channel for transmitting ACK/NACK, PMI, RI, etc. to an uplink.

First of all, various accesses for extending a symbol space for a CQI channel will be described. Particularly, a method for extending a symbol space while maintaining compatibility in multiple carriers/single carrier will be described. Herein, a symbol space means a dimension where information can be expressed or transferred. The symbol space can be configured by combination of various methods that can increase bit opportunity. For example, the symbol space can be configured by various kinds of combination of signal modulation, time, frequency, code, etc. Accordingly, increase of the symbol space means that symbols can be expressed or transmitted in more various manners. This means that the transmission amount of uplink control information increases.

At present, a CQI channel of 3GPP LTE depends on only modulation symbol opportunity identified by time. The simplest method that can increase a symbol space while maintaining the current structure is to use a modulation order higher than the current modulation order. At present, in the CQI channel of 3GPP LTE, a modulation order is limited to QPSK. This is because that a low modulation order has to be established to enhance reliability of control information, considering importance of the control channel and a communication condition (for example, fading, delay, noise, coverage, power limit, etc.) in a macro cell.

However, in a small cell such as a femto cell, since a radio channel has AWGN characteristic, the radio channel is less affected by fading. Also, since high speed movement of the user equipment is limited and coverage is small, delay became considerably low. Furthermore, when considering small coverage of the femto cell, the power used for uplink transmission of the user equipment could be a relatively high level. Accordingly, when considering such a feature of the femto cell, it is not necessary to establish a modulation order of the uplink control channel at low level. Namely, even in case that the uplink control channel has a higher modulation order, degradation may not occur in signal quality of the control channel uplink-transmitted within the femto cell.

Accordingly, the user equipment within the femto cell or with high channel quality can establish a modulation order of the CQI channel at a level higher than that of QPSK. For example, constellation of points such as 8, 16, 32 and 64 can be used. In this case, the respective points can be arranged to be identified from one another in such a manner that their size and phase are controlled within constellation. For example, the uplink control channel can be modulated by n-PSK, rotated n-PSK, n-QAM (Quadrature Amplitude Modulation), rotated n-QAM, or their superposition. In this case, n means the number of points within constellation.

The aforementioned method has a drawback in that proper QoS may not be assured. However, the aforementioned method is advantageous in that it is perfectly compatible with the existing CQI and does not need any separate supplemental structure. If there is difference in the modulation order of the control channel uplink-transmitted by the user equipment between the macro cell and the femto cell, the user equipment can selectively control the modulation order considering a type of a cell to which the user equipment belongs or the information a user reported. Hereinafter, to increase the information amount through the uplink control channel, a method of extending a symbol space by varying structure interpretation or modifying the symbol space will be described.

Embodiment 1

Extension of Symbol Space

1) Simple Aggregation Through Single Carrier/Multiple Carriers

When a user equipment has a plurality of radio frequency (RF) transmission channels (i.e., user equipment has a separate RF chain for multiple antennas or multiple carrier bands), the user equipment can use them to the highest degree. In this case, the symbol space can be extended without additional configuration. CQI information can be transmitted through a control channel generated separately on multiple carriers. Alternatively, if limitation of a power amplifier is not serious, CQI information may directly be transmitted to several control channels on a single carrier. If several control channels are simultaneously used for a single carrier, a single carrier property of SC-FDMA is degraded but it does not matter since power limitation is not serious. In this regard, both in single carrier and multiple carriers in uplink, a plurality of PUCCH can be configured on a certain uplink carrier, where each PUCCH may be identified by frequency resources, e.g. physical resource block, and/or sequence resources such as CAZAC or ZC sequence or computer-generated sequences. Thus more control information can be transmitted through a plurality of PUCCH on a certain uplink carrier at the same time.

2) Extension of Symbol Space Through Additional Space

In order to increase CQI channel capacity, a method for increasing constellation may be considered. In a state that it is assumed that transmission power is sufficient, if CQI channel is used with a modulation order which is simply defined by QPSK, QoS may be set too high. Examples of sufficient transmission power include a case where there is no limitation in a power amplifier and a case where a user equipment is served in a cell having small coverage, such as a femto cell or a micro-cell. In this case, as a method for increasing CQI symbol space, a modulation order may be increased or additional space may be used together with a modulation order.

Figure 6:
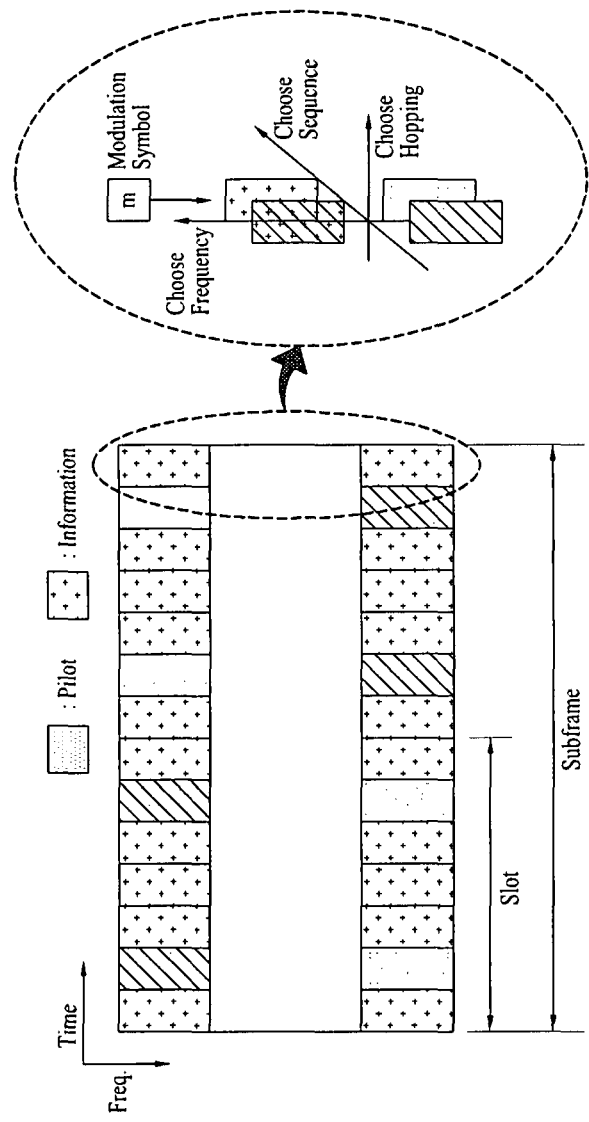
FIG. 6 is a diagram illustrating an example of extending a symbol space of an uplink control channel in accordance with one embodiment of the present invention.

FIG. 6 is a diagram illustrating an example of extending a symbol space of an uplink control channel in accordance with one embodiment of the present invention. Referring to FIG. 6, a symbol space for information transmission can be extended using modulation dimension, sequence dimension, frequency dimension, hopping dimension or their combination. Namely, it is possible to extend the space using a modulation order of a signal, sequence carrying the modulated signal, and a subcarrier transmitting the modulated signal.

The modulation dimension includes PSK, rotated-PSK, QAM, rotated-QAM, and Gaussian minimum shift keying (GMSK). In more detail, the modulation dimension includes BPSK, rotated-BPSK, QPSK, rotated-QPSK, 16PSK, rotated-16PSK, 16QAM, 64QAM, or superposition modulation according to their combination. In view of extension of the symbol space, the modulation dimension can be extended in such a manner that the number of constellation increases like QPSK, 8PSK, and 16QAM (or 16PSK if it is necessary to fix the output power of each modulated symbol).

If the sequence dimension is used, the user equipment differently selects sequence used for same information. In this way, modification can be made in transmission information. For example, when '1' is to be transmitted, one sequence which is previously defined is used to transmit a modulated symbol, and when '0' is to be transmitted, another sequence which is previously defined is used to transmit a modulated symbol. If more bit information is to be transmitted with selection of sequence, more sequences can be used. The sequence dimension includes Zadoff-Chu (ZC) sequence corresponding to orthogonal sequence, constant amplitude zero autocorrelation waveform (CAZAC) sequence, walsh sequence, and discrete fourier transform (DFT) sequence or computer generated sequences. The sequence dimension further includes quasi-orthogonal sequence and pseudo noise (PN) sequence having small correlation characteristic. In the aforementioned method, since the sequence dimension is used for extension of the symbol space, the number of user equipments that can simultaneously be transmitted through one control channel can be reduced. However, if the number of user equipments within a cell (for example, femto cell) is small, it does not matter even though sequence is used in the symbol space. Note that the used symbol space may not be disjointed distinctly among the sequence dimension and modulation symbol. That is, the total transmission information may consist a set of symbol space and the sequence selection can be defined as a specific state(s) of the symbol space set.

Another method for increasing the symbol space is to include frequency dimension. Namely, extension of the symbol space includes application for use of frequency resources. It is assumed that control channels exist on a frequency axis. In this case, different frequency resources (i.e., different subbands/channels/carrier) can be used for the same signal. In other words, additional bit information can be defined depending on a location (subband/channel/carrier) of a frequency region, to which a signal is transmitted. Extension of a symbol space on a time axis includes use of different hopping patterns. For example, if the number of bits to be added upon signal transmission is small, signal transmission can be transmitted in such a manner that the location where the modulation symbol is carried is hopped per OFDM symbol or per slot or per subframe in accordance with a given rule. Since a pattern rule indicates bit information, bit information indicated by the corresponding hopping pattern cannot be identified until hopping of transmission information is completed. Accordingly, use of SC-FDMA symbols of a narrow band can be more advantageous in decoding information than use of SC-FDMA symbols of a wide band. If hopping is performed for SC-FDMA symbols of a wide band, the hopping pattern indicates the least significant bit (LSB) of information, whereby decoding performance may not be degraded.

The aforementioned additional dimensions can be used in combination to extend the symbol space. Also, if multiple carriers are available, application for use of frequency resources can include a way that a specific carrier is selected from multiple carriers to carry additional information.

3) Reduced Pilot

Under the environment (for example, environment where Doppler frequency and frequency offset are small) where channel is good, a large number of pilots are not required. Particularly, in an environment such as a femto cell where capacity of a base station is not better than that of the user equipment, a pilot structure more advantageous for the user equipment can be used. Also, if the number of user equipments existing within a cell is small, the necessity of pilot is more reduced.

Figure 7:
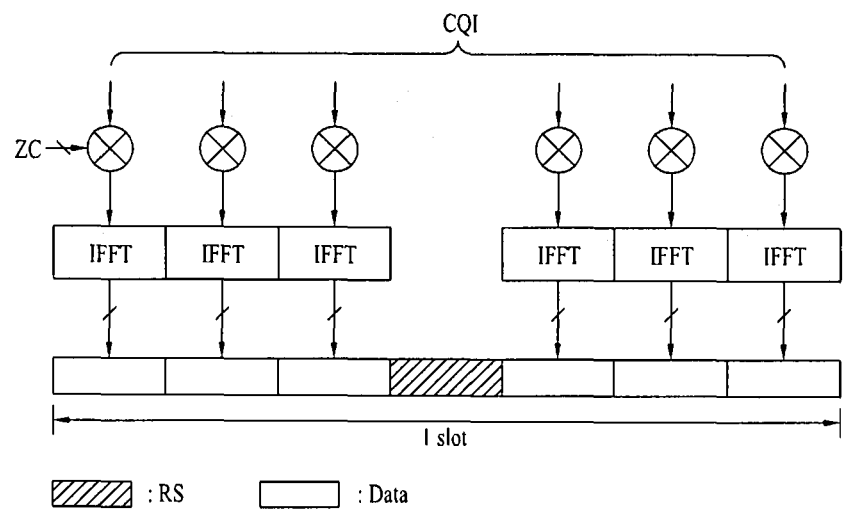
FIG. 7 is a diagram illustrating an example of allocating a modified pilot to an uplink control channel in accordance with one embodiment of the present invention.

FIG. 7 is a diagram illustrating an example of allocating a modified pilot to an uplink control channel in accordance with one embodiment of the present invention. Referring to FIG. 7, among seven SC-FDMA symbols included in one slot, pilot (RS) is carried in the center SC-FDMA symbol, and CQI information is carried in the other six SC-FDMA symbols. In case of a femto cell where high speed movement of the user equipment is limited, it does not matter even if one pilot is included in one slot. The location of SC-FDMA symbols, to which pilot is allocated, is exemplarily illustrated, and the pilot may easily be arranged on a control channel. If PUCCH format 1 is exploited in the aforementioned invention, then the OFDM symbols used for pilot can be up to 3 OFDM symbols and they can be reused for additional information such as carrier aggregation case or MIMO extension.

Each user equipment is identified using orthogonal sequence (for example, cyclic shift version of one root sequence). CQI information symbols are modulated and then transmitted through all SC-FDMA symbols, each of which includes one sequence. The sequence is a frequency region spreading code, and includes orthogonal sequence, quasi-orthogonal sequence or other sequence having excellent correlation characteristic.

As illustrated in FIG. 7, if a pilot structure is modified, CQI information can be carried in the SC-FDMA symbol in which pilot was once allocated before. Accordingly, the number of CQI information symbols that can be transmitted in one subframe increases by 2, and if QPSK mapping is used, information of maximum 4 bits can be transmitted additionally.

Figure 8:
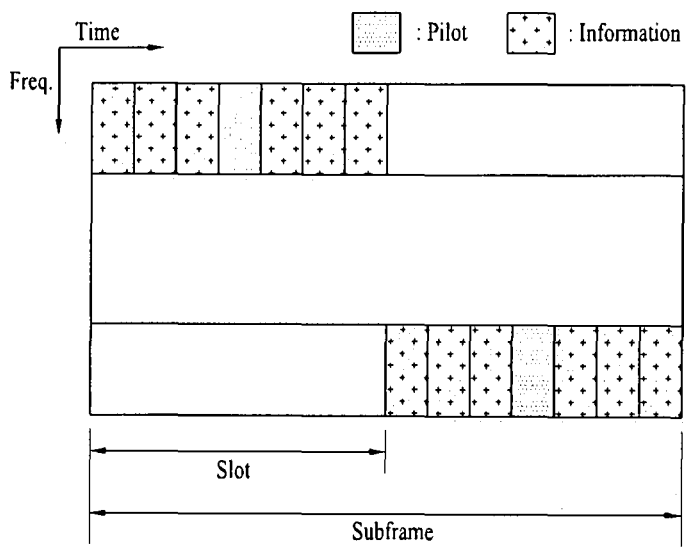
FIG. 8 is a diagram illustrating a structure of a modified pilot in accordance with one embodiment of the present invention.

FIG. 8 is a diagram illustrating a structure of modified pilot in accordance with one embodiment of the present invention.

Referring to FIG. 8, the number of pilots per slot is reduced from two to one. This less affects channel estimation in an environment such as a micro or femto cell. In this way, the user equipment within the femto cell can use one SC-FDMA symbol per slot to transfer CQI or other control information.

Figure 9:
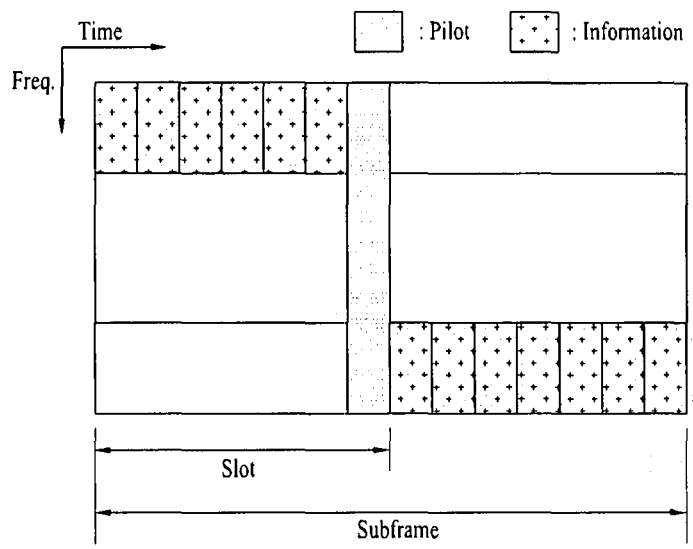
FIG. 9 is a diagram illustrating another structure of a modified pilot in accordance with one embodiment of the present invention.

FIG. 9 is a diagram illustrating another structure of a modified pilot in accordance with one embodiment of the present invention.

Referring to FIG. 9, the user equipment transmits pilot using one SC-FDMA symbol within a subframe. In this way, a pilot channel commonly used by all user equipments may be considered. In an environment such as a micro/femto cell, since a channel is not rapidly changed, the user equipment can transmit a pilot to all bands once. In other words, one pilot symbol exists at one TTI, and user equipments within a femto cell transmit their pilot to a corresponding location. In this case, a user equipment which uses a femto cell and a user equipment which uses a shared channel (i.e., band for transmitting data/control codeword) use a common pilot channel. As the aforementioned structure is used, channel features of the femto cell and counter symmetric power (i.e., power AMP of user equipment is better than that of base station) of user equipment/base station within the femto cell can be used. Also, a symbol space for transmitting more control channels or data can be generated.

In the aforementioned configuration, a structure of a pilot over a band used by a corresponding femto cell has a limitation in that the pilot should be scalable. For example, since a user equipment which uses a control channel of 1 RB size may exist, a receiver should use a pilot structure of which performance is reduced in a small range. For example, as a pilot sequence is generated in a unit of RB and cover sequence is used, a pilot sequence can be generated without much degradation in peak-to-average power ratio/cubic metric (PAPR/CM) feature. In FIG. 9, the location and the number of pilots are exemplary, and the pilots can easily be arranged on the control channel. Also, a plurality of pilots may exist within one subframe, or one pilot may exist per several subframes. The pilot bandwidth is exemplary and its size can be just one PRB size or multiple PRB size depending on the high layer configuration.

Figure 10:
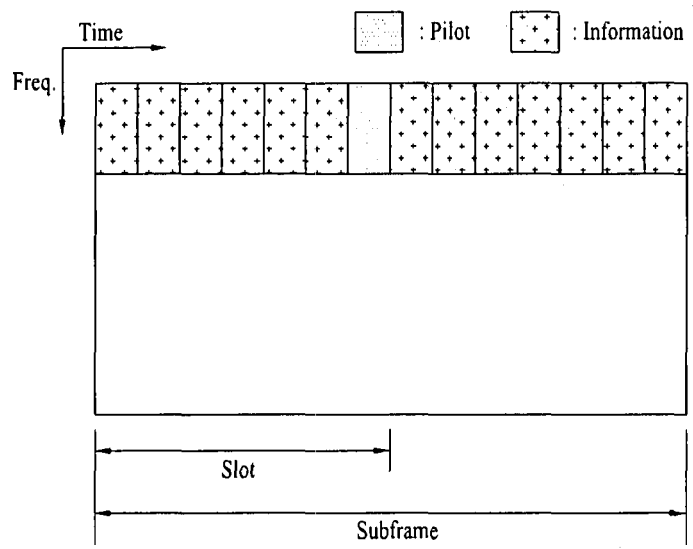
FIG. 10 is a diagram illustrating other structure of a modified pilot in accordance with one embodiment of the present invention.

FIG. 10 is a diagram illustrating other structure of a modified pilot in accordance with one embodiment of the present invention. In an environment such as a micro/femto cell, since the user equipment has enough power margin in a power amplifier (PA), PAPR/CM does not matter actually. Moreover, as illustrated in FIG. 9, configuration of a pilot that occupies one SC-FDMA symbol may have a problem in view of design. Accordingly, in spite of slight disadvantage of PAPR/CM, a structure of transmitting a signal within only a corresponding control channel is used preferably. To this end, hopping can be limited for a control channel. In an environment where flat fading similar to AWGN occurs, gain of slot hopping is little obtained. Accordingly, as illustrated in FIG. 10, the pilot can be modified in such a manner that slot hopping is excluded and thus control channels are continued within one subframe. This structure is compatible with the structure of the existing control channel and at the same time extends CQI symbol space. In FIG. 10, the location and the number of pilots are exemplary, and the pilots can easily be arranged on the control channel. Also, a plurality of pilots may exist within one subframe, or one pilot may exist per several subframes.

4) Multiple Antenna Extension

If a user equipment has multiple antenna transmission capability (i.e., several transmission RF chain/power amplifiers exist), the user equipment can transmit an uplink control channel using the above capability, thereby ensuring QoS of the receiver more efficiently and enhancing spectral efficiency. Particularly, if the amount of CQI information to be transmitted increases due to increase of antennas, the multiple antenna transmission capability is necessarily required for extension of symbol space. However, another access different from the general multiple antenna technology is required in view of the aspect that CQI information symbols are modulated and then transmitted through all SC-FDMA symbols, each of which includes one sequence. Hereinafter, a method for transmitting a signal through multiple antennas while maintaining a single carrier transmission characteristic of the existing SC-FDMA will be described in detail.

Figure 11:
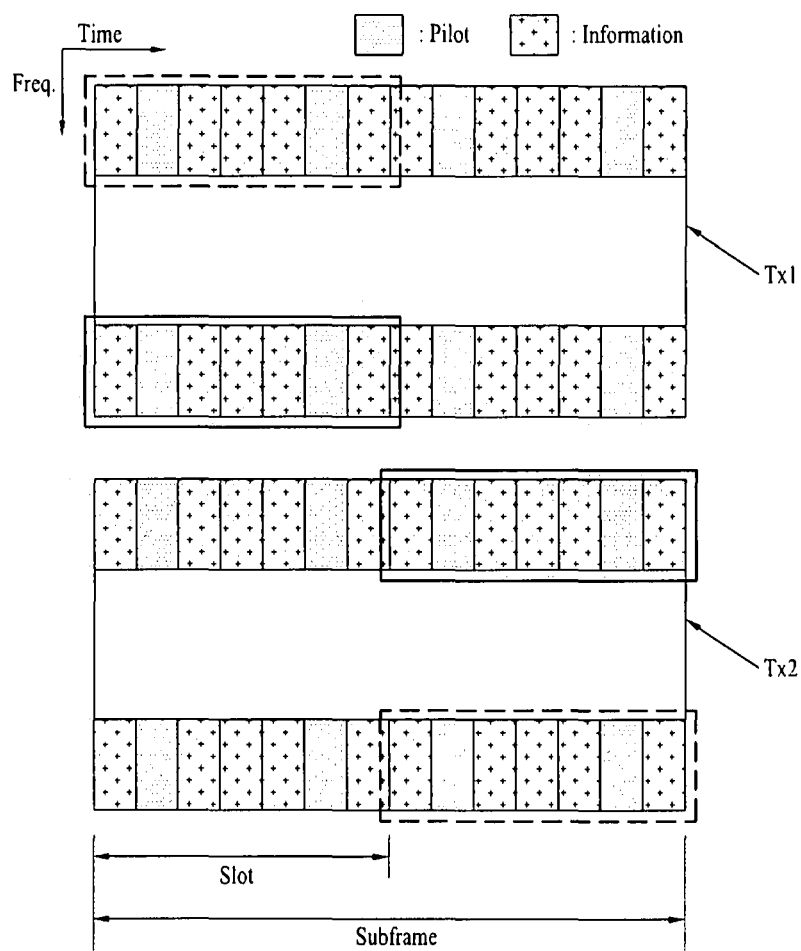
FIG. 11 is a diagram illustrating an example of transmitting an uplink control channel through multiple antennas in accordance with one embodiment of the present invention.

FIG. 11 is a diagram illustrating an example of transmitting an uplink control channel through multiple antennas in accordance with one embodiment of the present invention. In FIG. 11, a signal is transmitted using different transmission resources (for example, different control channels which may reside in the same PRB or different PRBs which also can belongs to the same carrier or different carriers) through different antennas. In this case, a format used for a single transmitting antenna can be used as a transmission format. However, the used symbol relation among multiple antennas can be defined in a way to obtain diversity gain or achieve larger symbol space. Antenna selection can be applied to the transmitted signal. Antenna selection means that antenna through which the signal is transmitted is varied at a specific interval. Namely, although signals are transmitted through all antennas, the signals transmitted through each of the antenna can be exchanged with one another under a predetermined condition. Antenna selection can be applied to the transmitted signals in a unit of slot, subframe and a multiple thereof. Also, constellation of the signal transmitted through each antenna can be modified. Namely, operation such as conjugate can be applied to the signal transmitted through each antenna. Note that this modification can be applied in unit of modulation symbol only or full OFDM signal itself. Also, if there are requirements for the symbol space for transmitting CQI information is low, several transmitting antennas make a match in a certain number to form a transmission diversity structure. A scheme for transmission diversity includes a space time block code (STBC) scheme, a space frequency block code (SFBC), a space and sequence resource code scheme, etc. In this case, operation for transmission diversity can be applied to sequence, symbol or sequence/symbol.

The aforementioned method maintains compatibility with the existing user equipments but has a drawback in that more transmission resources are used.

Figure 12:
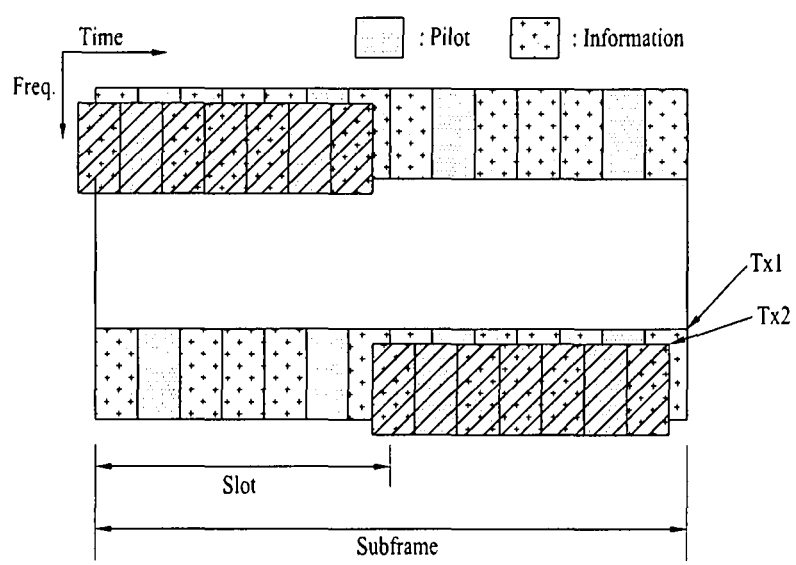
FIG. 12 is a diagram illustrating another example of transmitting an uplink control channel through multiple antennas in accordance with one embodiment of the present invention.

FIG. 12 is a diagram illustrating another example of transmitting an uplink control channel through multiple antennas in accordance with one embodiment of the present invention. In FIG. 12, each antenna transmits a signal using the same transmission resource. In this case, since several antennas are provided, a scheme for obtaining transmission diversity or spatial multiplexing can be used.

Transmission diversity can be obtained when the same signal is transmitted through multiple antennas. Namely, the user equipment transmits signals in such a manner that the receiver cannot identify a signal of each antenna. However, since transmitting antennas of the user equipment are arranged to adjoin one another, power-delay profiles transferred to receiving antennas of the receiver through each channel occur similarly. If channel phase of the signals forms destructive beam, the receiver cannot obtain diversity gain. Accordingly, if the uplink control channel is transmitted using the same resource, attention is required so that beamforming does not occur in the control channel signal.

In order to reduce beamforming between the uplink control channels, a method of adding small cyclic delay may be considered. Namely, by adding different cyclic delays to the uplink control channel per transmitting antenna, superposition of power-peak does not occur in the receiver.

If channel estimation can be performed for a pair of transmitting-receiving antennas, more various diversity or spatial multiplexing can be obtained. To this end, each antenna should perform independent channel estimation and can use multiple pilot symbol structure.

Figure 13:
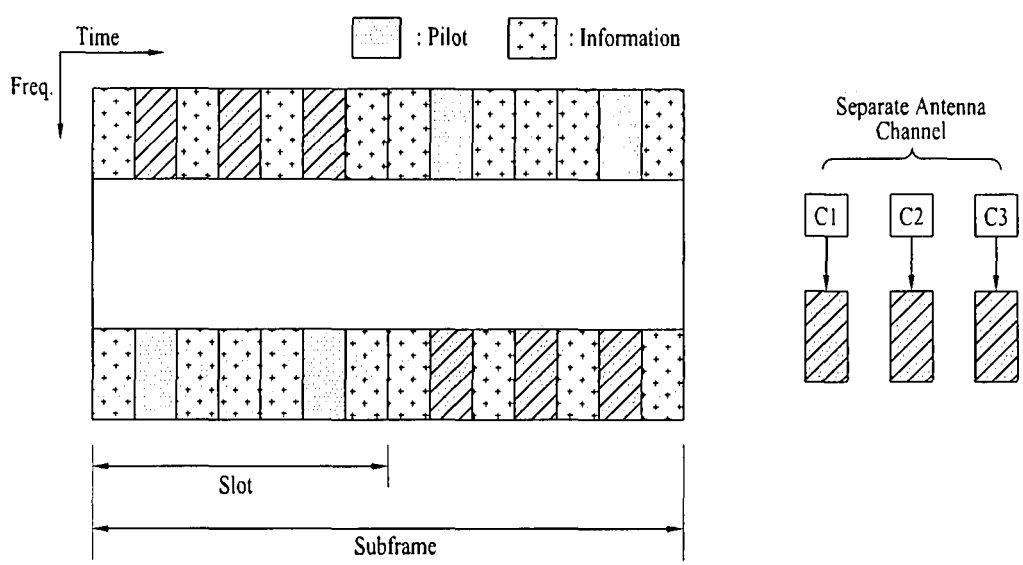
FIG. 13 is a diagram illustrating other example of transmitting an uplink control channel through multiple antennas in accordance with one embodiment of the present invention.

FIG. 13 is a diagram illustrating other example of identifying a pilot symbol of each antenna upon transmitting an uplink control channel through multiple antennas in accordance with one embodiment of the present invention. Referring to FIG. 13, a plurality of pilot symbols existing within one slot can be identified using different sequences. A method of using sequences will be described later. The pilot symbols can be allocated in such a manner that respective SC-FDMA symbols are allocated to different antennas or combination of SC-FDMA symbols is applied to antenna set.

Furthermore, if there are a lot of antennas, the respective antennas properly make a match to share the same resource. In this case, pilots of the matched antennas can be identified using sequence. If the pilots are identified, since demodulation can be performed by extracting control information related to a pilots once the pilots are identified, it is enough to apply the sequence to only the pilots. The number of pilots that can be identified by the sequence is varied depending on the sequence length. Also, the sequence length is limited by the number of pilot symbols. For example, if the number of pilot symbols within one slot is 3, the sequence length is limited to 3. In this case, since the number of pilots that can be identified by the sequence is 3, the number of antennas that can be matched is 3. If hopping per slot is limited, the sequence length is limited by the number of pilot symbols in a subframe. The sequence includes Zadoff-Chu (ZC) sequence corresponding to orthogonal sequence, constant amplitude zero autocorrelation waveform (CAZAC) sequence, walsh sequence, discrete fourier transform (DFT)

sequence. The sequence further includes quasi-orthogonal sequence and pseudo noise (PN) sequence having excellent correlation characteristic.

Specifically, an uplink slot structure for CQI of 3GPP LTE includes five CQI information symbols and two pilot symbols, and hopping per slot is applied (FIG. 5). Since two pilot symbols per slot exist, the sequence length is 2. Accordingly, two antennas (or bundles) can be identified. In this case, the symbol space is extended to a space of maximum 5*2=10. To increase the number of pilots that can be identified, the number of pilot symbols included in one slot should be increased. Referring to FIG. 13, one slot includes four data symbols and three pilot symbols. Since the number of pilot symbols is 3, sequence having a length of 3 can be applied. For example, the sequence having a length of 3 includes $\{(1, 1, 1), (1, e^{j2\pi/3}, e^{j4\pi/3}), (1, e^{j4\pi/3}, e^{j2\pi/3})\}$. Accordingly, three antennas (or bundles) can be identified. In this case, the symbol space is extended to a space of maximum 4*3=12. In this way, if the symbol space increases in accordance with increase of antennas, pilots can additionally be allocated. Also, the symbol space can be used for diversity if there is not much information to be transmitted. Namely, a signal can be transmitted through each antenna in such a manner that the signal is coded using STBC or SFBC. In this case, the coded signal includes at least one of modulation symbol and sequence signal.

Alternatively, a pilot symbol of each antenna can be transmitted using antenna selection in accordance with the position of the pilot symbol. For example, each antenna can be configured to transmit one pilot symbol and antenna through which the pilot symbol is transmitted is varied at a specific interval. Namely, although pilot symbols are transmitted through all antennas, the pilot symbols transmitted through each of the antenna can be exchanged with one another under a predetermined condition. Antenna selection can be applied in a unit of slot, subframe and a multiple thereof. Alternatively, a pilot signal of each antenna can be multiplexed using FDM scheme within one pilot symbol. On the other hand, the antenna transmitting pilot symbol can be varied over time within the same slot or subframe so that the same control channel resource is shared to estimate the channel response without causing any additional resource overhead. For example, if there are two pilot symbols, then one antenna transmits at one of the two OFDM symbol positions and the other antenna transmits at the other OFDM symbol position with the same control channel resource. In this case, the spatial multiplexing/diversity capability is enabled without requiring multiple control channel resources.

Figure 14A:
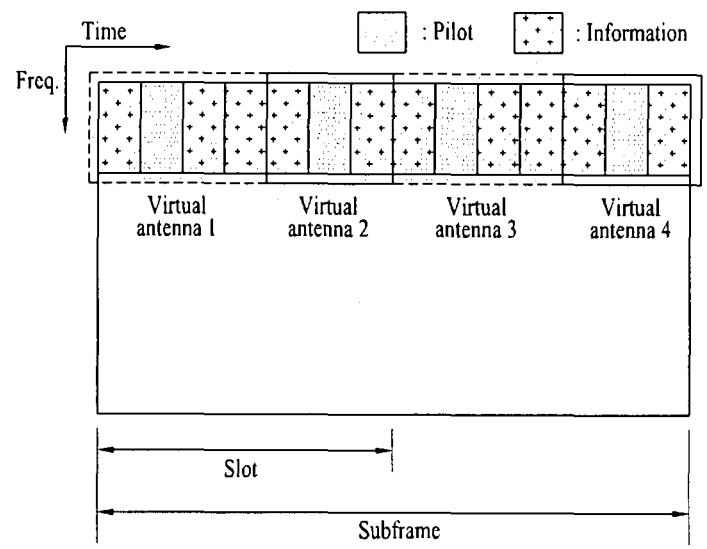
FIGS. 14A and 14B are a diagrams illustrating one example of increasing diversity gain of uplink control channel by employing virtual antenna hopping.
Figure 14B:
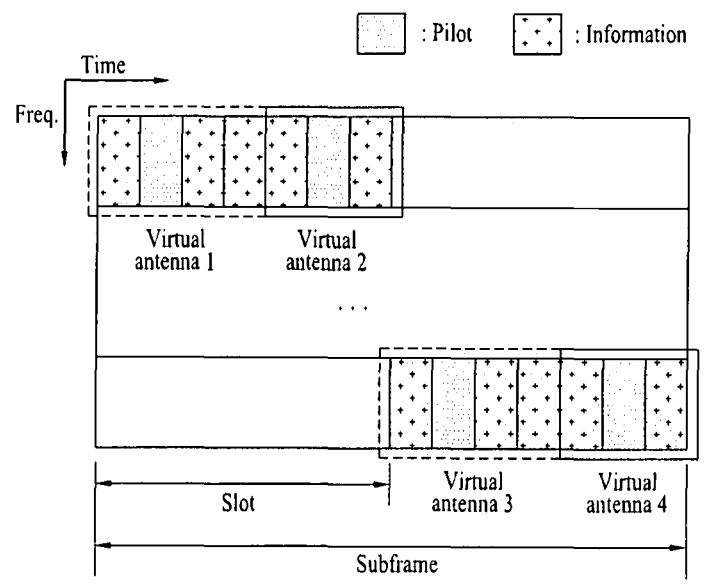

FIGS. 14A and 14B are diagrams illustrating one example of increasing diversity gain of uplink control channel by employing virtual antenna hopping. The virtual antenna may be corresponding to rows of each precoding matrix. If a plurality of precoding vectors are used, each precoding vector may be corresponding to different virtual antennas. In this method, pilot symbols as many as virtual antennas are necessary and a pilot signal is precoded before being transmitted.

Referring to FIGS. 14A and 14B, duration of virtual antenna can include at least one SC-FDMA symbol and also one or more pilot symbols therein. The duration of virtual antenna can be varied as long as it includes at least one pilot symbol. If CQI channel is configured as exemplified in FIG. 8, diversity gain can be increased by hopping two virtual antennas. If CQI channel is configured as exemplified in FIG. 10, single virtual antenna can be used.

Virtual antennas can be associated based on a hopping position. For example, different virtual antenna can be defined at each hopping position but virtual antennas 1 and 3 can be precoded with a same precoding matrix and virtual antennas 2 and 4 can be precoded with another same precoding matrix. In addition, these bundles of antennas, e.g. virtual antennas 1 and 3, can be coded with a block coding such as STBC or can be spatially multiplexed. And, differently from the example of FIGS. 14A and 14B, durations of each virtual antenna can configured to be three SC-FDMA symbols and then four SC-FDMA symbols in one slot.

If the number of SC-FDMA symbols transmitted through each virtual antenna like virtual antennas 1 and 2 is not equal, the number of coded bits through each virtual antenna can be controlled inequally. That is, the number of bits carried on each SC-FDMA symbol can be controlled, thereby the total amount of information transmitted through each virtual antenna during one slot or subframe can be made as being same. For example, coded bits of each SC-FDMA symbol transmitted through virtual antenna 2 can be increased with compared to those through virtual antenna 1.

Note that to support the aforementioned MIMO extension, the channel estimation capability should be provided before the control channel transmission mode is set up. To measure the control channel quality, a eNB can configure PUCCH so that the control channel information can be measured without sounding reference channel. Exemplary transmission mode can be a non-precoded transmission for the DM-RS transmission from the multiple antennas. If this is not available, then sounding reference channel can be extended to the corresponding control channel region within system bandwidth so that eNB can measure the control channel status. After this measurement, eNB can manipulate the control channel transmission mode.

5) Modified Coding Scheme for Control Information

In LTE, under the assumption that 20 coded bits are modulated into 10 modulated symbols using QPSK, using a RM (Reed-Muller) code of (20, N) which supports control information up to 13 bits, linear combination of 13 base sequences is applied where bit-wise addition is carried out by multiplying N information bit per N base sequence. If user equipments which need an extended symbol space related to UE feedback control information are under good channel conditions such as high geometry in uplink, small cell coverage and LoS (Line of Sight), a code of (P, Q) can be considered in control information coding scheme. The code of (P, Q) includes a RM code of (P, Q) where P is the order of the code and Q is parameter related to the length of code. For example, a code of (20, M) can be applied to one example of the present invention where M is assigned as a certain number of 14 to 20 in the view of control information bit which is transmitted through each PUCCH control channel. Namely, this method can increase effective code rate of specific control information under such a good channel conditions. The code of (20, M) can be obtained from RM code of (20, N) by applying the same method as used in reducing TFCI code of (32, 10), which is used in HSDPA (High Speed Downlink Packet Access, from 32 bits to 10 bits in view of coded bits or extending the TFCI code of (32, 10) from 10 bits to 13 bits in view of information bits. By this way, a base sequence table of (20, M) codes can be constructed. Alternatively, generating new code sequences can be also considered.

The proposed method of extending symbol space in transmitting control information in uplink can be applied, but not limited thereto, for the following cases: transmitting UE feedback control information in a system with extended number of downlink transmission antenna and/or increased number of codewords accompanied thereby; transmitting, through a certain uplink carrier, UE feedback control information on at least one downlink transmission where carrier aggregation and/or spectrum aggregation is applied; transmitting by a relay node at least one control information in joint when relaying operation is used in a certain cell; and transmitting by a relay node or a user equipment feedback control information in uplink when above cases occurs in combination.

If the number of SC-FDMA symbols for data is given as being N and the number of coded bits is given as being P under the extended symbol space, code bit to SC-FDMA symbol mapping can be configured to transmit in average P/N coded bits through each SC-FDMA symbol. To this end, simply PSK- or QAM-based modulation scheme can be used or coded modulation can be also used. In addition, as for the cases that reliability of SC-FDMA symbols appears to be different or reliability of SC-FDMA symbols are indeed different due to their structures, the number of coded bits transmitted through one SC-FDMA symbol can be configured differently per SC-FDMA symbol. In this case, uplink control channel can be structurally modified to add a unequal protection function on coded bits.

Figure 15:
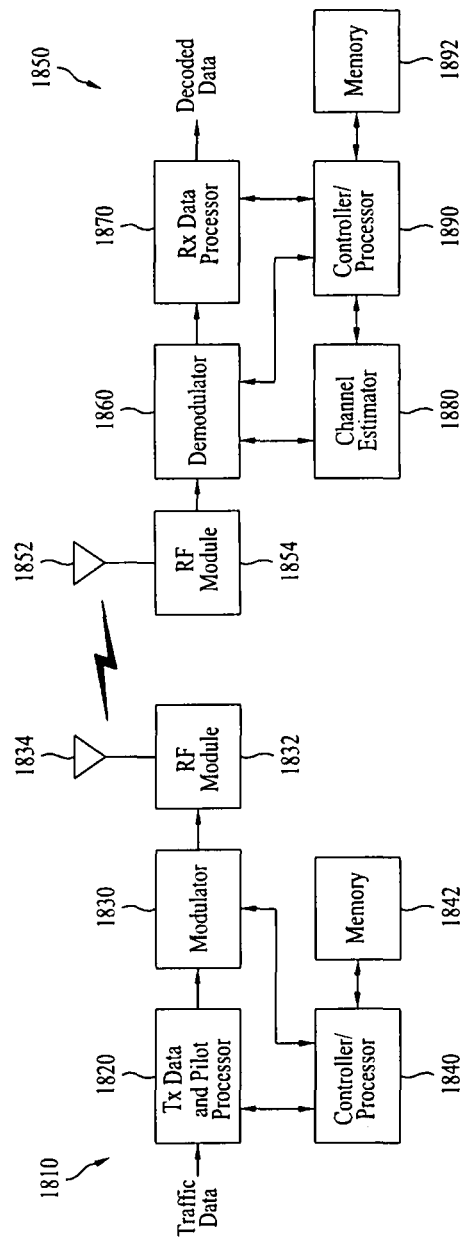
FIG. 15 is a block diagram illustrating a transmitter and a receiver according to the present invention.

FIG. 15 is a block diagram illustrating a transmitter and a receiver according to the present invention. In a downlink, a transmitter 1810 is used as a part of a base station, and a receiver 1850 is used as a part of a user equipment. In an uplink, a transmitter 1810 is used as a part of a user equipment, and is used as a part of a base station.

Referring to FIG. 15, in the transmitter 1810, a transmission (Tx) data and pilot processor (Tx Data and Pilot Processor) 1820 encodes data (for example, traffic data and signaling), interleaves the encoded data, and performs symbol mapping on the interleaved data, thus generating data symbols. The processor 1820 generates pilot symbols, so that it multiplexes the data symbols and the pilot symbols. The data symbol is a modulation symbol for data, and the pilot symbol is a modulation symbol for a pilot. Modulator 1830 generates transmission symbols using at least one of OFDMA scheme, SC-FDMA scheme, MC-FDMA (Multi Carrier-FDMA) scheme, CDMA scheme and the like. A radio frequency (RF) module 1832 performs a variety of processes (e.g., analogue conversion, amplifying, filtering, and frequency-up conversion) on the transmission symbols, thus generating an RF signal to be transferred through an antenna 1834. In the receiver 1850, an antenna 1852 receives a signal transferred from the transmitter 1810, and provides the RF module 1854 with the received signal. The RF module 1854 performs a variety of processes (e.g., filtering, amplifying, frequency-down conversion, and digitalizing) on the received signal, and provides input samples. Demodulator 1860 demodulates input samples using at least one of OFDMA scheme, SC-FDMA scheme, MC-FDMA scheme, CDMA scheme and the like, and provides data values and pilot values using the demodulated input samples. A channel estimator 1880 derives a channel estimation value from the received pilot values. Demodulator 1860 detects (or equalizes) received data values using the channel estimation value, and provides data symbol estimation values for the transmitter 1810. A reception (Rx) data processor 1870 performs symbol demapping, de-interleaving, and decoding on data symbol estimation values, and provides decoded data. Generally, Demodulator 1860, and the Rx data processor 1870 in the receiver 1850 are complementary to modulator 1830, and the Tx Data and Pilot processor 1820 in the transmitter 1810.

Controller/Processor 1840 controls and manages operations of a variety of processing modules in the transmitter 1810 to perform operations exemplified in FIGS. 1 to 14, and Controller/Processor 1890 controls and manages operations of a variety of processing modules in the receiver 1850 to perform operations exemplified in FIGS. 1 to 14. A memory 1842 stores program codes and data for the transmitter 1810, and a memory 1892 program codes and data for the receiver 1850.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point. Also, the user equipment may be replaced with terms such as user equipment (UE) and mobile subscriber station (MSS).

The embodiments according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method of processing data in a wireless communication system according to the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be applied to a wireless communication system. In detail, the present invention can be applied to a method for uplink transmitting a control channel in a wireless communication system.

What is claimed is:

1. A method for transmitting information at a user equipment in a wireless communication system, the method comprising:

transmitting a physical channel using a first frequency resource in a first time slot; and transmitting the physical channel using a second frequency resource in a second time slot, wherein if a frequency hopping pattern from the first frequency resource in the first time slot to the second frequency resource in the second time slot matches a predefined pattern, the frequency hopping pattern indicates specific information.

2. The method of claim 1, wherein the specific information includes at least one of acknowledgement/non-acknowledgement (ACK/NACK), a channel quality indicator (CQI), a precoding matrix index (PMI), and a rank indicator (RI).

3. The method of claim 1, wherein the physical channel comprises at least one symbol, a first pilot symbol and a second pilot symbol, and wherein if a sequence of the first pilot symbol and the second pilot symbol matches a first sequence, the at least one symbol indicates first information, and if the sequence of the first pilot symbol and the second pilot symbol matches a second sequence, the at least one symbol indicates second information.

4. The method of claim 1, wherein the physical channel is transmitted using one of a plurality of sequences, and each of the plurality of sequences indicates different information.

5. The method of claim 4, wherein the plurality of sequences includes orthogonal sequence, quasi-orthogonal sequence, or pseudo noise (PN) sequence.

6. The method of claim 4, wherein the plurality of sequences includes Zadoff-Chu (ZC) sequence, constant amplitude zero autocorrelation waveform (CAZAC) sequence, Walsh sequence, or discrete Fourier transform (DFT) sequence.

7. The method of claim 1, wherein the physical channel comprises at least one symbol, and the at least one symbol is modulated by one of BPSK (binary phase shift keying), rotated-BPSK, QPSK (quadrature phase shift keying), rotated-QPSK, n-PSK (phase shift keying), or n-QAM (Quadrature Amplitude Modulation), n indicating 8, 16, 32, or 64.

8. The method of claim 1, wherein each of the first frequency resource and the second frequency resource includes at least one subcarrier.

9. The method of claim 1, wherein each of the first frequency resource and the second frequency resource includes at least one subband.

10. The method of claim 1, wherein the first time slot and the second time slot form a subframe.

11. The method of claim 1, wherein the first frequency resource and the second frequency resource are located in different locations in a frequency domain.

12. The method of claim 1, wherein the transmitting of the information is performed within a femto cell or pico cell.

13. A user equipment for transmitting information in a wireless communication system, the user equipment comprising:

a radio frequency (RF) module; and a processor, wherein the processor is configured to:

transmit a physical channel through the RF module using a first frequency resource in a first time slot, and transmit the physical channel through the RF module using a second frequency resource in a second time slot, wherein if a frequency hopping pattern from the first frequency resource in the first time slot to the second frequency resource in the second time slot matches a predefined pattern, the frequency hopping pattern indicates specific information.

14. The user equipment of claim 13, wherein the specific information includes at least one of acknowledgement/non-acknowledgement (ACK/NACK), a channel quality indicator (CQI), a precoding matrix index (PMI), and a rank indicator (RI).

* * * * *